Patented June 3, 1947

2,421,653

UNITED STATES PATENT OFFICE 2,421,653

PREPARATION OF POLYORGANOHALO-GENOPOLYSILOXANES

Robert O. Sauer, Schenectady, N. Y., assignor to General Electric Company, a corporation of New York No Drawing. Application July 1, 1944, Serial No. 543,207

19 Claims. (Cl. 260—607)

The present invention relates to the preparation of polyorganohalogenopolysiloxanes; i. e., compounds of silicon, oxygen, halogen, and a plurality of monovalent hydrocarbon radicals, in which the silicon atoms are connected by oxygen, each silicon atom being connected to at least one oxygen, the remaining valences of the silicon atoms being satisfied by lower monovalent hydrocarbon radicals, such as methyl, ethyl, and phenyl radicals, or halogen atoms, specifically chlorine or bromine atoms.

Although not restricted thereto, the invention is primarily concerned with the preparation of organodihalogenosiloxanes of the type described and claimed in copending application Serial No. 463,812, filed October 29, 1942, in the name of Winton I. Patnode, now Patent No. 2,381,366, issued August 7, 1945, and assigned to the same assignee as the present invention. The dihalogenosiloxanes described in that application have the general formula X[SiR₂O]ₙSiR₂X 

wherein X represents a halogen atom, particularly a chlorine atom, R represents a monovalent lower alkyl group, particularly a methyl group, and n is an integer equal to at least one, and preferably not more than 5.

The present invention is based on the discovery that halogenosilanes and organopolysiloxanes, i. e. hydrocarbon-substituted polysiloxanes, undergo equilibrium reactions to form a mixture of compounds comprising some unreacted halogenosilane and organopolysiloxane plus a mixture of polyorganohalogenosiloxanes. The types of halogenated polysiloxanes produced in accordance with the present invention depend on the nature and proportions of the starting materials. For example, when a dihalogenosilane such as dimethyldichlorosilane and a polymethylpolysiloxane such as dimethyl silicone are the starting materials, the chloropolysiloxanes obtained as a result of the equilibration reaction essentially comprise the polymethyldichloropolysiloxanes described in the above-mentioned Patnode application. On the other hand, if all or part of the organohalogenosilane employed as a starting material with the dimethyl silicone is a monohalogenosilane, the reaction products will comprise some monohalogenopolysiloxane as well as polymethyldihalogenopolysiloxanes. Similarly, if all or part of the organohalogenosilane component is a trihalogenosilane or a tetrahalogenosilane, the reaction products will include polyhalogenosiloxanes, containing three or more halogen atoms, wherein some of the silicon atoms may be connected to two or three halogen atoms.

The equilibration reactions may be represented generically by the equation

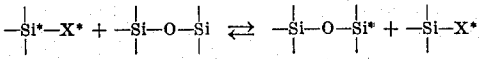

in which X represents a halogen atom and the asterisks serve to identify the atoms comprising the original halogenosilane molecules. As the equilibration reaction takes place extremely slowly at room temperatures in the absence of a catalyst, I prefer to carry out the reaction at elevated temperatures in the presence of a catalyst such as a hydrogen halide, particularly hydrogen chloride or hydrogen bromide, or at room temperature in the presence of a hydrogen halide catalyst and ferric chloride.

In order that those skilled in the art better may understand how the present invention may be carried into effect, the following illustrative examples are given.

*Example 1.*—The copper liner of a steel bomb was charged with 725 grams dimethyldichlorosilane and 702 grams of a dimethyl silicone. The dimethyl silicone employed in this and a number of the following examples was obtained by hydrolysis of dimethyldichlorosilanes which in some cases contained small amounts of methyltrichlorosilane not exceeding 2.5 mol per cent. The charged bomb was sealed and maintained at a temperature of 380 to 400 degrees for 5 hours. During this period the contents were continually agitated by rocking the bomb. The bomb was then allowed to cool to room temperature and the reaction mixture subjected to fractional distillation. The weight percentage of the components separated from the reaction mixture are given in the following table:

| Compound | Weight (Per Cent) |
|---|---|
| Hexamethylcyclotrisiloxane | 0.2 |
| Octamethylcyclotetrasiloxane | 1.0 |
| Dimethyldichlorosilane | 13 |
| Tetramethyl-1,3-dichlorodisiloxane | 22 |
| Hexamethyl-1,5-dichlorotrisiloxane | 19 |
| Octamethyl-1,7-dichlorotetrasiloxane | 15 |
| Higher boiling fraction including higher polymethyldichloropolysiloxanes | 26 |

In the system of nomenclature employed in naming the polysiloxane compounds, the silicon and oxygen atoms of the Si—O—Si chain are designated by numerals so that all the silicon atoms in the chain are designated by odd numbers.

In this respect, the system of nomenclature differs from that employed in the above-entitled Patnode application.

The methylchlorosilane employed in the preceding example contained a small amount of hydrogen chloride present therein as a result of partial hydrolysis of the chlorosilane by the water vapor present in the air coming in contact therewith. Although the hydrogen chloride and other hydrogen halides catalyze the equilibration reactions at room or elevated temperatures, little or no reequilibration of the products occurs at normal distillation temperatures since these volatile catalysts are removed from the reaction mixtures at the beginning of the distillation period.

*Example 2.*—This example illustrates a modification of the present invention in which an elevated temperature alone is responsible for the acceleration of the equilibration reaction. From a mixture of 101 parts of a liquid dimethyl silicone and 130 parts of dimethyldichlorosilane, 25 parts of the latter was removed by careful distillation in order to insure complete removal of hydrogen chloride. The remaining material was then carefully transferred to a dry glass pressure vessel in a manner designed to prevent contact of the material with the air. The pressure vessel was sealed and heated at a temperature of from 150 to 160 degrees for 19 hours. Fractional distillation of the reaction products showed that 41 per cent of the dimethyldichlorosilane had been consumed in the reaction and converted to polymethyldichloropolysiloxanes of the type described in Example 1.

The equilibration reactions may be caused to take place at room temperature by the use of hydrogen chloride or equivalent hydrogen halide or a mixture thereof with an iron halide such as ferric chloride.

*Example 3.*—A mixture of 109 parts of a dimethyl silicone, 101 parts of dimethyldichlorosilane and 3.5 parts of hydrogen chloride was allowed to stand at room temperature in a glass pressure vessel for 29½ hours. Distillation analysis at the end of this period showed that 38 per cent by weight of dimethyldichlorosilane remained in the reaction mixture indicating a 21 per cent conversion of this reactant to polymethyldichloropolysiloxanes.

*Example 4.*—An increase in the relative proportions of chloropolysiloxane products can be obtained by carrying out the reaction at an elevated temperature in the presence of a catalyst. A mixture of 107 parts of a liquid dimethyl silicone, 99 parts dimethyldichlorosilane, and 3.5 parts hydrogen chloride was heated at 115 to 125 deg. C. in a sealed glass pressure bottle for 15 hours. The product of reaction was found to contain 7 per cent by weight of dimethyldichlorosilane, 21 per cent tetramethyl-1,3-dichlorodisiloxane, and 26 per cent hexamethyl-1,5-dichlorotrisiloxane. The conversion of dimethyldichlorosilane in this example was 85 per cent.

*Example 5.*—A glass pressure vessel was charged with 106 parts dimethyldichlorosilane, 107 parts dimethyl silicone, and 1 part by weight of ferric chloride hexahydrate. The vessel was closed immediately. A slow evolution of hydrogen chloride was noted on the surface of the iron chloride particles a a result of hydrolysis of a small portion of the dimethyldichlorosilane by the water of hydration. When the hydrolysis was completed, the remaining iron chloride dissolved in the reaction mixture. After standing at room temperature for 2 hours, the reaction mixture was analyzed by distillation and was found to contain 8 per cent by weight of dimethyldichlorosilane and 23 per cent tetramethyl-1,3-dichlorodisiloxane. The remaining portion of the reaction mixture was composed of unreacted dimethyl silicone and the higher polymethyldichloropolysiloxanes. The conversion of dimethyldichlorosilane in this experiment was 82 per cent. The equilibration reaction appeared to be completed during the 2-hour period since a reaction mixture containing the same proportions of reactants and catalyst which was allowed to stand for 70 hours at room temperature (instead of 2 hours) was found to contain the same concentration (8 per cent) of unreacted dimethyldichlorosilane.

*Example 6.*—A steel autoclave was charged with a mixture of 50 parts by weight of dimethyl silicone oil and 50 parts by weight dimethyldichlorosilane. The autoclave was then heated to a temperature of 145 to 155 deg. C. for 20 hours. Distillation analysis of the reaction products showed the presence of about 9 per cent unconverted dimethyldichlorosilane, 24 per cent tetramethyl-1,3-dichlorodisiloxane, 27 per cent hexamethyl-1,5-dichlorotrisiloxane, and 39 per cent of a mixture of higher boiling dichloropolysiloxanes containing 4 or more silicon atoms.

*Example 7.*—A steel autoclave was charged with 516 parts of dimethyldichlorosilane and 650 parts of hexamethyldisiloxane. These reactants were heated together in the autoclave at 200 deg. C. for eleven hours. Upon distillation of the reaction mixture 696 parts of trimethylchlorosilane, about 8 parts of hexamethyldisiloxane and 16 parts of pentamethylchlorodisiloxane were obtained. The residue from the distillation (369 parts) contained higher molecular weight mono- and di-chlorinated polysiloxanes. The pentamethylchlorodisiloxane, $(CH_3)_3SiOSi(CH_3)_2Cl$, distilled at 118.6–119.6 deg. C. at 758 mm.

*Example 8.*—A glass pressure bottle was charged with 255 parts of silicon tetrachloride, 112 parts of hexamethyldisiloxane and one gram of ferric chloride hexahydrate. The bottle was quickly capped, shaken for a short time and allowed to stand for four hours. The reaction mixture was fractionally distilled. The products comprised 191 parts of unreacted silicon tetrachloride, 76 parts of trimethylchlorosilane, and 23 parts 1,1,1-trimethyl-3,3,3-trichlorodisiloxane which distilled at 127.0–127.3 deg. C. at 754 mm. pressure.

*Example 9.*—Employing the apparatus and procedure set forth in Example 8, 327 parts of an equimolar mixture of silicon tetrachloride and hexamethyldisiloxane were reacted in the presence of 0.9 part of ferric chloride hexahydrate. The charged pressure vessel was allowed to stand 42 hours. Distillation of the reaction mixture yielded a trimethylchlorosilane fraction, a silicon tetrachloride fraction, and 62 parts of a 1,1,1-trimethyl-3,3,3-trichlorodisiloxane fraction.

The process specifically described in Examples 8 and 9 offers an advantageous method for recovering trimethylchlorosilane from an azeotropic mixture of trimethylchlorosilane and silicon tetrachloride by reacting the mixture with hexamethyldisiloxane. Equilibration of the trimethylchlorosilane component and hexamethyldisiloxane yields the same two identical compounds while equilibration of the silicon tetrachloride component and hexamethyldisiloxane, as is shown in the examples, consumes silicon tetrachloride and yields some trimethylchlorosilane.

While the invention has been particularly described with reference to the equilibration of mixtures of methylpolysiloxanes and dimethyldichlorosilane or tetrachlorosilane, it is to be understood that it is not limited thereto. Any halogenosilane of the type formula $R_nSiX_{4-n}$ where $n$ is equal to 0, 1, 2, or 3, R represents a lower alkyl or aryl radical, and X represents a chlorine or bromine atom, may be reacted with any hydrocarbon-substituted polysiloxane which is soluble in the halogenosilane. Examples of suitable polysiloxanes other than those given in the examples are the ethyl polysiloxanes and phenyl polysiloxanes such as the diethyl and diphenyl silicones as well as the liquid organopolysiloxanes having the general formula $R_{2a+2}Si_aO_{a-1}$ in which the various R's represent the same or different lower monovalent hydrocarbon radicals, specific examples of which are the methyl, ethyl, and phenyl radicals and $a$ is a whole number and is equal to at least 2. Oily compositions comprising such siloxanes containing three or more silicon atoms are described in the copending application of Winton I. Patnode, Serial No. 463,814, filed October 29, 1942, and assigned to the same assignee as the present invention.

If desired, large yields of any desired polyorganohalogenosiloxane can be obtained from a given quantity of starting materials by reequilibration of parts of the reaction products. For example, if tetramethyl-1,3-dichlorosiloxane is the desired product, the products obtained by equilibrating a mixture of dimethylsilicone and dimethyldichlorosilane are separated by distillation into three fractions: a low boiling fraction, a second fraction boiling at approximately 138 deg. C. at 760 mm. which is the boiling point of the desired compound, and a third fraction boiling above 138 deg. C. The first and third fractions are then recombined, reequilibrated and the process repeated with or without the addition of more dimethyldichlorosilane or more dimethylsilicone, or both.

What I claim as new and desire to secure by Letters Patent of the United States is:

1. The process which comprises effecting reaction, at a temperature which is at least room temperature, between (1) a hydrocarbon-substituted polysiloxane and (2) a halogenosilane corresponding to the formula $R_nSiX_{4-n}$, where R represents a monovalent hydrocarbon radical, X represents a halogen atom, and $n$ has a value equal to one of the following: 0, 1, 2, 3.

2. A process as in claim 1 wherein R in the formula of the halogenosilane of (2) represents an alkyl radical.

3. The process which comprises effecting reaction at an elevated temperature between (1) a hydrocarbon-substituted polysiloxane and (2) a halogenosilane corresponding to the formula $R_nSiX_{4-n}$, where R represents a monovalent hydrocarbon radical, X represents a halogen atom, and $n$ has a value equal to one of the following: 0, 1, 2, 3.

4. The process which comprises effecting reaction, in the presence of a hydrogen halide and at a temperature which is at least room temperature, between (1) a hydrocarbon-substituted polysiloxane and (2) a halogenosilane corresponding to the formula $R_nSiX_{4-n}$, where R represents a monovalent hydrocarbon radical, X represents a halogen atom, and $n$ has a value equal to one of the following: 0, 1, 2, 3.

5. A process as in claim 4 wherein the reaction is effected in the presence of both a hydrogen halide and an iron halide.

6. A process as in claim 4 wherein the reaction is effected in the presence of a hydrated ferric chloride.

7. The process of preparing alkyldihalogenopolysiloxanes which comprises reacting a dialkyldihalogenosilane with an alkylpolysiloxane at a temperature which is at least room temperature.

8. The process of preparing alkylhalogenopolysiloxanes which comprises effecting an equilibration reaction between an alkylhalogenosilane and an alkylpolysiloxane at a temperature which is at least room temperature.

9. The process which comprises effecting an equilibration reaction between a dimethyldihalogenosilane and a dimethyl silicone at a temperature which is at least room temperature.

10. The process which comprises reacting dimethyldichlorosilane with a dimethyl silicone at an elevated temperature.

11. The process which comprises effecting reaction between dimethyldichlorosilane and an approximately equal amount by weight of a dimethyl silicone at a temperature which is at least room temperature.

12. The process which comprises reacting dimethyldichlorosilane with a dimethyl silicone at an elevated temperature in the presence of a hydrogen halide.

13. The process which comprises reacting dimethyldichlorosilane with a dimethyl silicone at an elevated temperature in the presence of a small amount of hydrated ferric chloride.

14. The process which comprises reacting dimethyldichlorosilane with a dimethyl silicone at an elevated temperature in the presence of hydrogen chloride.

15. The process which comprises reacting dimethyldichlorosilane with a dimethyl silicone at an elevated temperature in the presence of small amounts of hydrogen chloride and an iron halide.

16. The process which comprises reacting dimethyldichlorosilane with a dimethyl silicone in the presence of small amounts of hydrogen chloride and ferric chloride, said reaction being effected at a temperature which is at least room temperature.

17. The process of preparing polymethyldichloropolysiloxanes which comprises heating a mixture of dimethyldichlorosilane and a dimethyl silicone to an elevated temperature in the presence of hydrogen chloride, removing the hydrogen chloride from the reaction products and fractionally distilling the remaining material to recover the polymethyldichloropolysiloxanes.

18. The process which comprises reacting hexamethyldisiloxane with tetrachlorosilane in the presence of small amounts of hydrogen chloride and ferric chloride and at a temperature which is at least room temperature.

19. The process which comprises reacting hexamethyldisiloxane with tetrachlorosilane and trimethylchlorosilane and at a temperature which is at least room temperature.

ROBERT O. SAUER.

REFERENCES CITED

The following references are of record in the file of this patent:

UNITED STATES PATENTS

| Number | Name | Date |
|---|---|---|
| 2,371,068 | Rochow | Mar. 6, 1945 |